United States Patent [19]

Eckel

[11] 4,415,601
[45] Nov. 15, 1983

[54] QUICK HARDENING ICING COMPOSITION

[76] Inventor: John A. Eckel, 2286 Edythe Dr., Dunedin, Fla. 33528

[21] Appl. No.: 374,115

[22] Filed: May 3, 1982

Related U.S. Application Data

[63] Continuation of Ser. No. 151,185, May 19, 1980, abandoned.

[51] Int. Cl.³ .............................................. A23G 3/00
[52] U.S. Cl. ...................................... 426/659; 426/94; 426/119; 426/124; 426/302; 426/396; 426/572; 426/321
[58] Field of Search ........................ 426/613, 659, 572

[56] References Cited

U.S. PATENT DOCUMENTS

| | | | |
|---|---|---|---|
| 2,024,356 | 12/1935 | Harris | 426/659 |
| 2,145,662 | 1/1939 | Miner et al. | 426/659 |
| 2,163,913 | 6/1939 | Otterbacher | 426/659 |
| 2,171,244 | 8/1939 | Otterbacher | 426/659 |
| 2,221,563 | 11/1940 | Young | 426/659 |
| 2,474,019 | 6/1949 | Steiner et al. | 426/659 |
| 2,598,282 | 5/1952 | Melnick | 426/659 |
| 2,651,574 | 9/1953 | Whittier | 426/659 |
| 3,767,830 | 10/1973 | Reimer | 426/659 |
| 3,955,008 | 5/1976 | Hanamoto | 426/659 |
| 4,017,645 | 4/1977 | Ziccarelli | 426/613 |
| 4,086,370 | 4/1978 | Olds et al. | 426/613 |
| 4,135,005 | 1/1979 | Cheng | 426/659 |

OTHER PUBLICATIONS

Food Products Formulary, vol. 1, Meats, Poultry . . . Komarik et al Avi Publ. 1974.

Primary Examiner—Steven L. Weinstein
Attorney, Agent, or Firm—Geoffrey R. Myers; Darle M. Short

[57] ABSTRACT

A quick hardening icing composition is disclosed which is used in conjunction with an improved bakery goods tray structure to carry out an improved method for processing and packaging bakery goods. Fresh, warm bakery goods are deposited upside-down onto a conveyor belt and the improved bakery goods tray structure is set down over the bakery goods. The tray structure and bakery goods are moved along the conveyor belt to a tipping station where the tray and bakery goods are oriented top side up without damage to the fragile bakery goods. The tray structure has substantially vertical sides terminated at their top by an outward projecting flange substantially coplanar with the top of the bakery goods. A layer of quick hardening icing is deposited on top of the bakery goods and overlaps and sealably mates with the outward projecting flange on the tray structure, sealing the bakery goods inside. The quick hardening icing includes a mixture of between 15 to 35 parts of powdered whey and between 17 to 30 parts of powdered corn starch mixed with between 6.25 to 11.25 parts of a high melting point fat. The resulting package of bakery goods sealed within the tray structure by the overlapping, quick hardening icing composition provides an easily handled unit which can be quickly packaged airtight in a wrapper without a lengthy drying time for the icing and bakery goods to provide an extremely fresh product.

5 Claims, 15 Drawing Figures

FOURTH EMBODIMENT

SEC. 2-2'

SEC. 3-3'

SEC. 2-2'
SECOND EMBODIMENT

SEC. 5-5'

SEC. 2-2'
THIRD EMBODIMENT

SEC. 7-7'

STRIP ICING APPLIED

SEC. 10b-10b'

QUICK HARDENING ICING COMPOSITION

This is a continuation, of application Ser. No. 151,185, filed May 19, 1980, now abandoned.

FIELD OF THE INVENTION

The invention disclosed broadly relates to food processing and more particularly relates to a quick hardening icing composition, bakery goods tray structure and method for processing packaging bakery goods.

BACKGROUND OF THE INVENTION

Fundamentally, baking has changed little since the Egyptians discovered that fermintation of the dough would make a lighter loaf of bread. The basic processes of grinding the grain, mixing the dough and allowing it to rise and then baking the loaf in an oven remain basically unchanged. The making of bakery goods has required the ingredients of flour, liquid, salt and yeast, the maintenance of an oven temperature during the rising process, skillful kneading and proper baking. Modern commercial bakers use the same ingredients and fundamentally the same methods as do domestic bakers, but because the doughs are very much larger in size, careful controls must be employed throughout the process to assure uniformity of the product. In the development of the commercial baking industry, highly mechanized factories have evolved to process bulk quantities of ingredients for producing many units of bakery goods.

In the commercial production of cakes and pastries, icings and frostings have customarily been applied to tops of the bakery goods to enhance their flavor and customer appeal. The frostings have been made of sugar and liquid heated to a desired temperature, combined with egg white and stirred to the desired consistency. Icings have been made of sugar mixtures which have not necessarily been cooked. In either case, a freshly baked, moist cake, for example, could not be immediately iced because of its fragility, but instead it would have to be dried for a period of time in order to firm up before it could be handled in the icing deposition process. Alternately, if the freshly baked, moist cake were iced within a short period after having been removed from its baking pan, both the cake and the icing had to be allowed to air dry for from 15 to 60 minutes in order to enable them to firm up sufficiently for subsequent handling in a wrapping machine. If the freshly iced cake were immediately wrapped, the residual moisture in the cake would migrate into the icing layer, desolving the sugar in the icing and making it stick to the inside of the wrapper. The prior art commercial baking practices for iced cakes and pastries have always included lengthy drying periods to allow the cake to firm up for subsequent handling, to allow the icing to dry to a non-sticky consistency, and to remove the moisture from the cake so as to avoid a subsequent dissolution of the icing layer within the wrapped package.

OBJECTS OF THE INVENTION

It is therefore an object of the invention to provide an improved icing composition.

It is a further object of the invention to provide a more rapidly hardening icing composition.

It is another object of the invention to provide an improved bakery goods tray structure for handling freshly baked goods.

It is still a further object of the invention to provide an improved bakery goods tray structure which will sealably mate with a quick hardening icing layer to seal the bakery goods inside.

It is yet a further object of the invention to provide an improved method for processing bakery goods.

It is still a further object of the invention to provide an improved method for packaging bakery goods.

SUMMARY OF THE INVENTION

These and other objects, features and advantages of the invention are accomplished by the invention disclosed herein. A quick hardening icing composition is disclosed which is used in conjunction with an improved bakery goods tray structure to carry out an improved method for processing and packaging bakery goods. Fresh, warm bakery goods are deposited upside down onto a conveyor belt and the improved bakery goods tray structure is set down over the bakery goods. The tray structure and bakery goods are moved along the conveyor belt to a tipping station where the tray and bakery goods are oriented top side up without damage to the fragile bakery goods. The tray structure has substantially vertical sides terminated at their top by an outward projecting flange substantially coplanar with the top of the bakery goods. A layer of quick hardening icing is deposited on top of the bakery goods and overlaps and sealably mates with the outward projecting flange on the tray structure, sealing the bakery goods inside. The quick hardening icing includes a mixture of between 15 to 35 parts of powdered whey and between 17 to 30 parts of powdered corn starch mixed with between 6.25 to 11.25 parts of a high melting point fat. The resulting package of bakery goods sealed within the tray structure by the overlapping, quick hardening icing composition provides an easily handled unit which can be quickly and freshly packaged airtight in a wrapper without a lengthy drying time for the icing and bakery goods.

DESCRIPTION OF THE FIGURES

These and other objects, features and advantages of the invention will be more fully appreciated with reference to the accompanying figures.

FIG. 10b is a plan cross sectional view along the section line 10b—10b' of FIG. 10a.

DISCUSSION OF THE PREFERRED EMBODIMENT

A quick hardening icing composition is disclosed which is used in conjunction with an improved bakery goods tray structure to carry out an improved method for processing and packaging bakery goods. Fresh, warm bakery goods are deposited upside-down onto a conveyor belt and the improved bakery goods tray structure is set down over the bakery goods. The tray structure and bakery goods are moved along the conveyor belt to a tipping station where the tray and bakery goods are oriented top side up without damage to the fragile bakery goods. The tray structure has substantially vertical sides terminated at their top by an outward projecting flange substantially coplanar with the top of the bakery goods. A layer of quick hardening icing is deposited on top of the bakery goods and overlaps and sealably mates with the outward projecting flange on the tray structure, sealing the bakery goods inside. The quick hardening icing includes a mixture of between 15 to 35 parts of powdered whey and between 17 to 30 parts of powdered corn starch mixed with between 6.25 to 11.25 parts of a high melting point fat. The resulting package of bakery goods sealed within the tray structure by the overlapping, quick hardening icing composition provides an easily handled unit which can be quickly packaged in a wrapper without a lengthy drying time for the icing and bakery goods.

Figure 8:
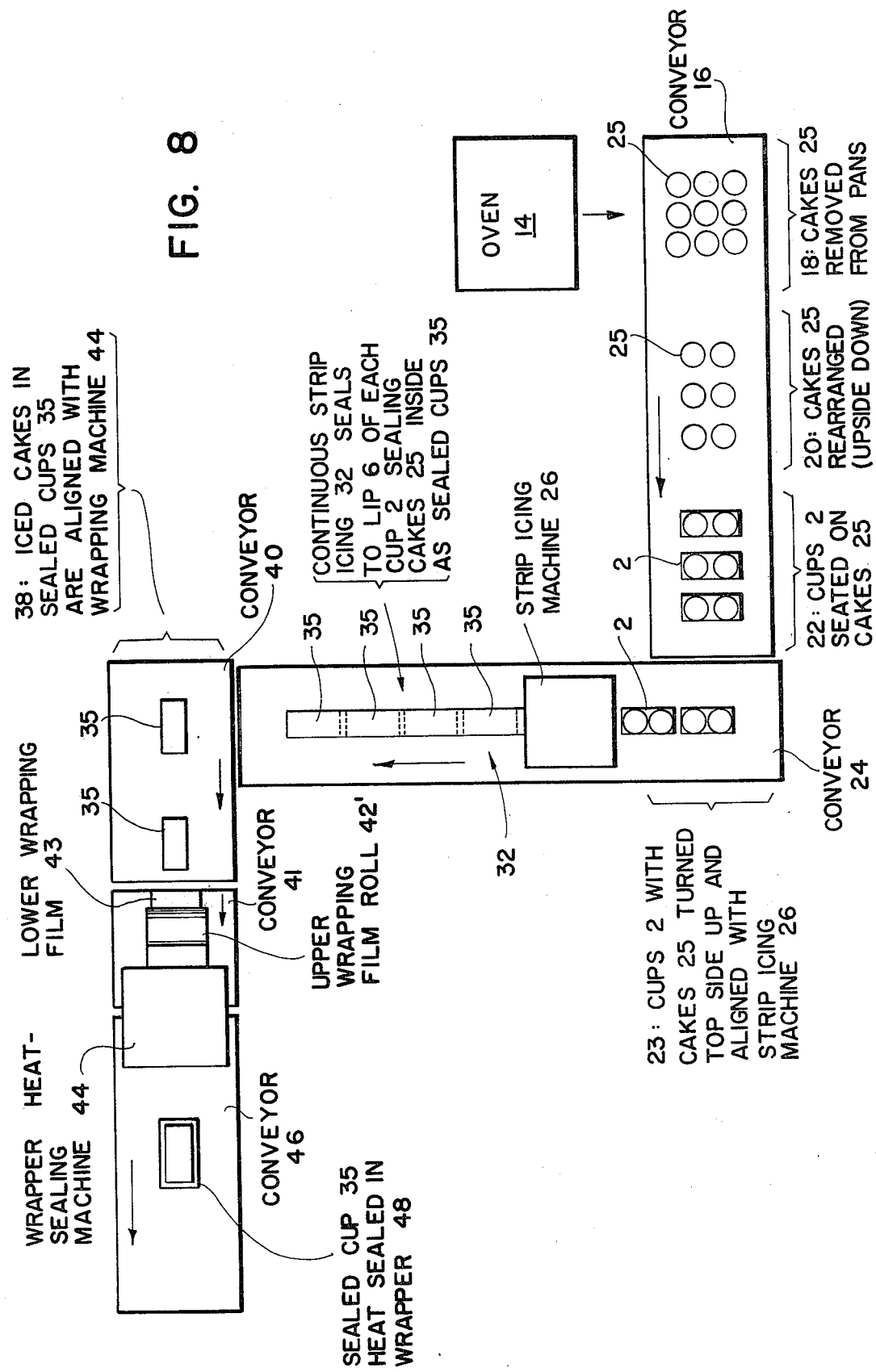
FIG. 8 is a plan view of the overall bakery goods processing structure and method.

FIGS. 1-7 and 13 illustrate various views of the bakery goods tray structure invention. FIG. 8 illustrates an overall view of the apparatus for processing and packaging bakery goods. Bakery goods such as cupcakes or other kinds of pastries are baked in the oven 14 in baking pans in the conventional manner. At the end of the baking cycle, the pans containing the bakery goods are removed from the oven 14 and the bakery goods, such as the cupcakes 25, are cooled to 100° F. in the pan and are removed from the baking pans and are placed upside down on the conveyor belt 16 at the station 18 in FIG. 8. In processes wherein creme filling is added to the cake, the total moisture content of the cake is increased thus rendering the cake even more difficult to handle and this process even more beneficial. As the conveyor belt 16 moves to station 20, the cakes 25 are rearranged, still in their upside-down orientation, so as to enable placing the bakery goods tray structure 2 upside down over the top of the bakery goods 25, so that their relative position is shown as in FIG. 9. In this manner, the cakes 25 are exposed to the air for less than five seconds, thus enhancing the moisture content and freshness of the cake and lengthening its shelf-life.

Figure 1:
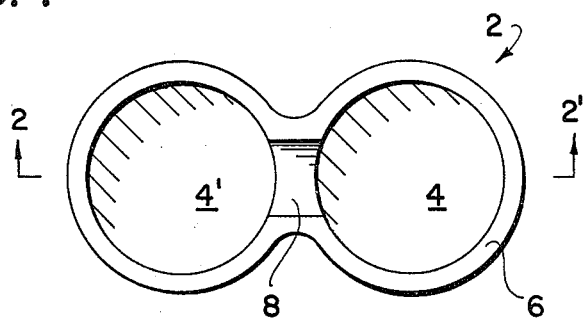
FIG. 1 is a top view of a first embodiment of the improved bakery goods tray structure.
Figure 13:
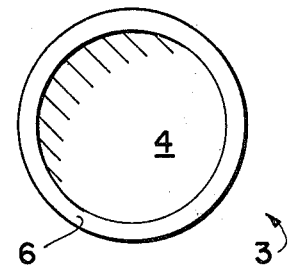
FIG. 13 is a top view of a fourth embodiment of the bakery goods tray structure invention.
Figure 2:
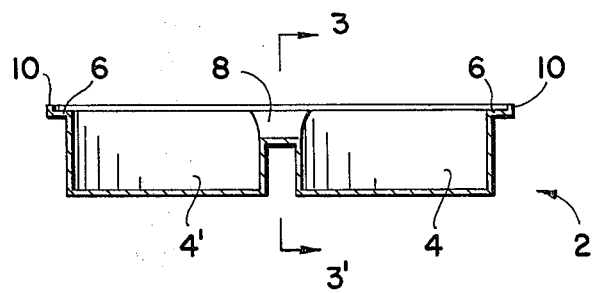
FIG. 2 is a cross sectional view along the section line 2—2' of FIG. 1.
Figure 3:
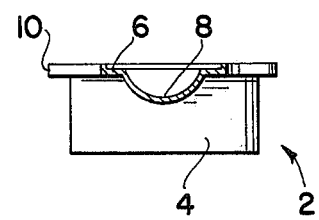
FIG. 3 is a cross sectional view along the section line 3—3' of FIG. 2.
Figure 4:
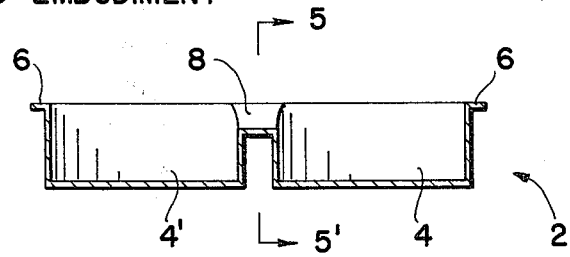
FIG. 4 is a cross sectional view along the section line 2—2' of FIG. 1, illustrating a second embodiment of the bakery goods tray structure invention.
Figure 5:
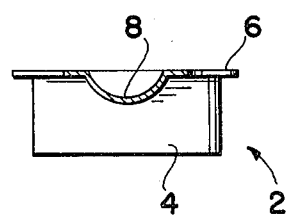
FIG. 5 is a cross sectional view along the section line 5—5' of FIG. 4.
Figure 6:
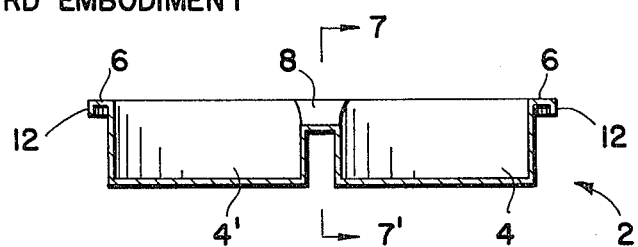
FIG. 6 is a cross sectional view along the section line 2—2' of FIG. 1, illustrating a third embodiment of the bakery goods tray structure invention.
Figure 7:
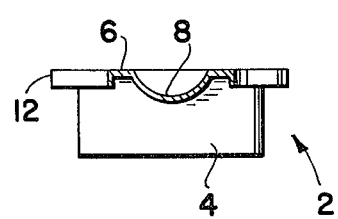
FIG. 7 is a cross sectional view along the section line 7—7' of FIG. 6.
Figure 9:
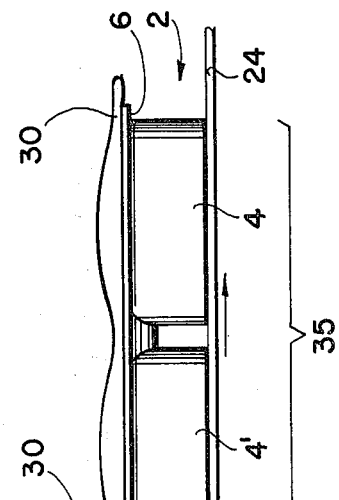
FIG. 9 is a breakaway view of the bakery goods tray structure shown in FIG. 4, with the bakery goods 25 having been deposited therein.

Four embodiments of the bakery goods tray structure are shown in FIGS. 1-7 and FIG. 13. All of these embodiments have in common the characteristics of being a generally cup-shaped receptacle 2 or 3 for retaining the fresh, warm baked goods. They have substantially vertical sides terminated at their top by an outward projecting flange 6 which will be substantially coplanar with the top of the bakery goods 25, such as is shown in FIG. 9. In the first, second and third embodiments shown in FIGS. 1-7, there are two cup-shaped portions 4 and 4' which are joined by the joining member 8. In the first embodiment of FIG. 2, the flange 6 is turned upwardly at 10. In the second embodiment shown in FIG. 4, the flange 6 remains flat. In the third embodiment shown in FIG. 6, the flange 6 is turned downwardly at 12. The fourth embodiment 3 shown in FIG. 13, is a unitary cup-shaped structure 4 suitable for holding a single unit of bakery goods. It is considered to be within the scope of the invention that the number of cup-shaped structures 4, 4', etc. joined into a single tray unit can be increased to an arbitrary number without departing from the spirit and the scope of the invention.

Figure 14:
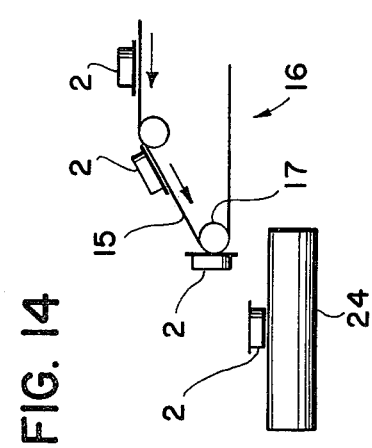
FIG. 14 is a side view of the tipping station 23 where the trays 2 with the cakes 25 are turned top side up.

In FIG. 8, after the bakery goods tray structure 2 has been placed over the cakes 25 at station 22 on the conveyor belt 16, the trays or cups 2 move on the conveyor belt 16 toward the tipping station 23 at the junction of the conveyor belt 16 and the conveyor belt 24, as is shown in a side view in FIG. 14. As the conveyor belt 16 moves forward, the trays 2 progress down an inclined plane 15 and travel over a small diameter roller 17 so that either a machine or an operator can readily grasp the bottom of the trays 2 and complete its reorientation from its original upside down position on the conveyor belt 16 to its top side up position on the conveyor belt 24, as is shown in FIG. 14.

Figure 10A:
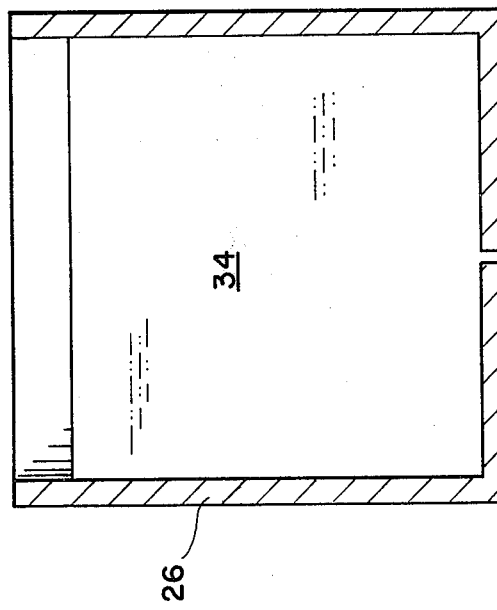
FIG. 10a is a side breakaway view of the strip icing machine 26.
Figure 10B:
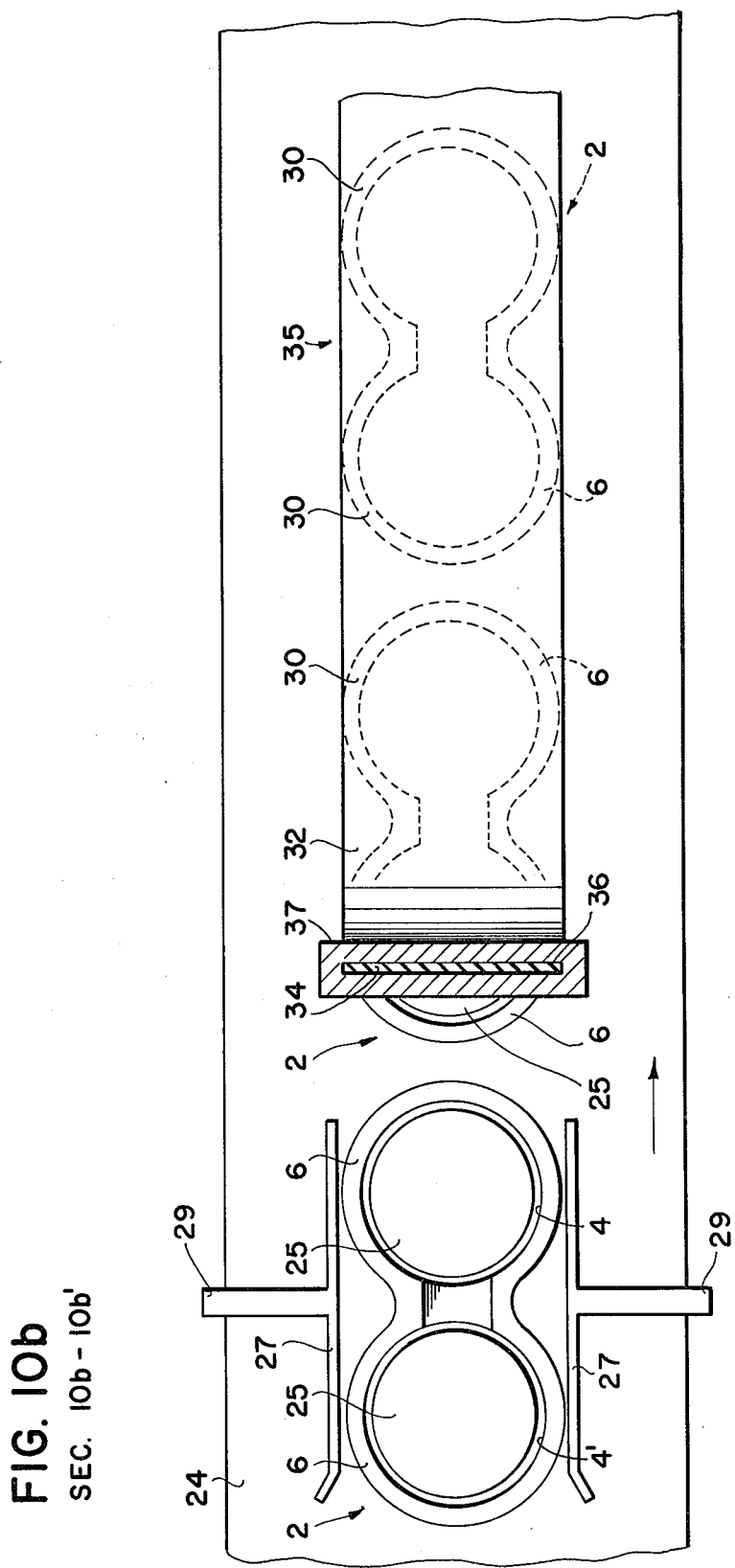

FIG. 8 shows that the bakery goods tray structure 2 containing the bakery goods 25 progresses on the conveyor belt 24 toward the strip icing machine 26, a side view of which is shown in FIG. 10a and a top view of which is shown in FIG. 10b. As may be seen in FIG. 10b, the guides 27 supported by the stationary mounts 29, orient the bakery goods tray structures 2 toward the center of the conveyor belt 24 so as to be aligned with the dispensing slot 36 of the strip icing machine 26. A quick hardening icing composition 34 is maintained in a relatively fluid state in the strip icing machine 26 by means of stirring or an elevated temperature and a strip of the icing 32 is extruded through the slot 36 of the extruder 37 of the strip icing machine 26, which is as wide as the outer diameter of the flange 6 on the bakery goods tray structure 2. The flange 6 is adapted to sealably mate with the quick hardening icing 32 along the regions 30 where they meet, so as to form a sealed compartment in which the bakery goods 25 is packaged, resulting in the sealed cups 35 which maintain the bakery goods in a fresh condition.

The quick hardening icing 34 generally has a composition with a relatively large proportion of powdered vegetable starch and powdered whey. Examples of specific compositions for the quick hardening icing 34 follow.

EXAMPLE 1

Blend a first mixture of:

| | |
|---|---|
| Water | 22.5 parts |
| Granulated cane sugar | 17.5 parts |
| Xanthan Gum (stabilizer) | 10 parts |
| Partially hydrogenated soybean and palm oils (high melting point fat or shortening, eg. Crisco (T.M. Proctor and Gamble)) | 9.25 parts |

Blend a second mixture of:

| | |
|---|---|
| Powdered cane sugar | 60.6 parts |
| Powdered whey | 26 parts |
| Powdered corn starch | 22 parts |
| Flavoring | .7 parts |
| Salt (NaCl) | .375 parts |
| Sorbic acid (Bactericidal agent) | .2 parts |

Blend a third mixture of:

| | |
|---|---|
| Shortening (e.g. Crisco (T.M. P.&G.)) | 14.25 parts |
| Coloring | .8 parts |
| Lecithin (Emulsifying agent) | .8 parts |
| Flavoring | .775 parts |
| Corn oil | 4 parts |

Thoroughly blend together the first, second and third mixtures. Then heat to a full boil followed by cooling to a spreading temperature forming the resultant icing mixture. Load the icing mixture into the feeding reservoir of a continuous strip icing machine.

EXAMPLE 2

Same as Example 1 except that in cold winter weather, modify the first mixture so that the high melting point fat is 6.25 parts.

EXAMPLE 3

Same as Example 1 except that in hot summer weather, modify the first mixture so that the high melting point fat is 11.25 parts.

EXAMPLE 4

Same as Example 1 except that the second mixture is modified as follows:

| | |
|---|---|
| Powdered whey | 15 parts |
| Powdered corn starch | 17 parts |

EXAMPLE 5

Same as Example 1 except that the second mixture is modified as follows:

| | |
|---|---|
| Powdered whey | 35 parts |
| Powdered corn starch | 30 parts |

EXAMPLE 6

Same as Example 1, except that the second mixture is modified by substituting powdered wheat flour for the powdered corn starch.

EXAMPLE 7

Same as Example 1, except that the first mixture is modified by substituting KLX as the high melting point fat.

EXAMPLE 8

Same as Example 1, except that the first mixture is modified by substituting lard as the high melting point fat.

EXAMPLE 9

Same as Example 1, except that the first mixture is modified by substituting a number three shortening as the high melting point fat.

In the above examples, the ingredient quantities are given in "parts", ie. parts per weight, which is common nomenclature in the baking industry. The ingredient wt %, corresponding to the ingredient parts for whey, vegetable starch powder, high melting pt. fat and sugar are as follows (wherein the high and low value is listed): whey 8.6, 16.9; vegetable starch powdered 9.8, 14.5; high melting point fat 3.3, 5.9; and sugar 37.8, 44.9.

Other types of stabilizers can be employed, for example Guar gum, dextrin, or cellulose derivatives.

Various types of hydrogenated vegetable oils can be substituted for the high melting point fat, such as hydrogenated cottonseed and soybean oils.

It is believed that the composition of the quick hardening icing with its relatively large proportion of powdered vegetable starch and powdered whey mixed with a high melting point fat, provides the following three properties: firstly of quickly hardening on the surface of the bakery goods (which ordinarily have a temperature at the time of icing application of approximately 100° F.), secondly of providing a barrier to the penetration of any residual moisture in the freshly baked cake into the icing, preventing the dissolution of the sugar in the icing after packaging, and thirdly of sealing the bakery goods within the tray 2 by adhering to the flange 6 of the tray.

FIG. 8 shows the train of sealed cups 35 covered with the continuous strip icing 32 issuing from the strip icing machine 26 along the conveyor 24. It is well within the skill of the art to include a decorating machine at the output side of the strip icing machine 26 to apply suitable decorations to the uniformly oriented continuous strip icing 32, if desired.

Figure 12:
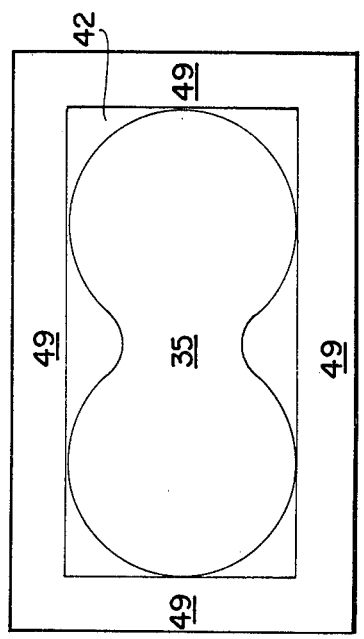
FIG. 12 is a top view of iced cakes in sealed trays or cups 35 after having been wrapped in the heat sealed wrapper 48.
Figure 11:
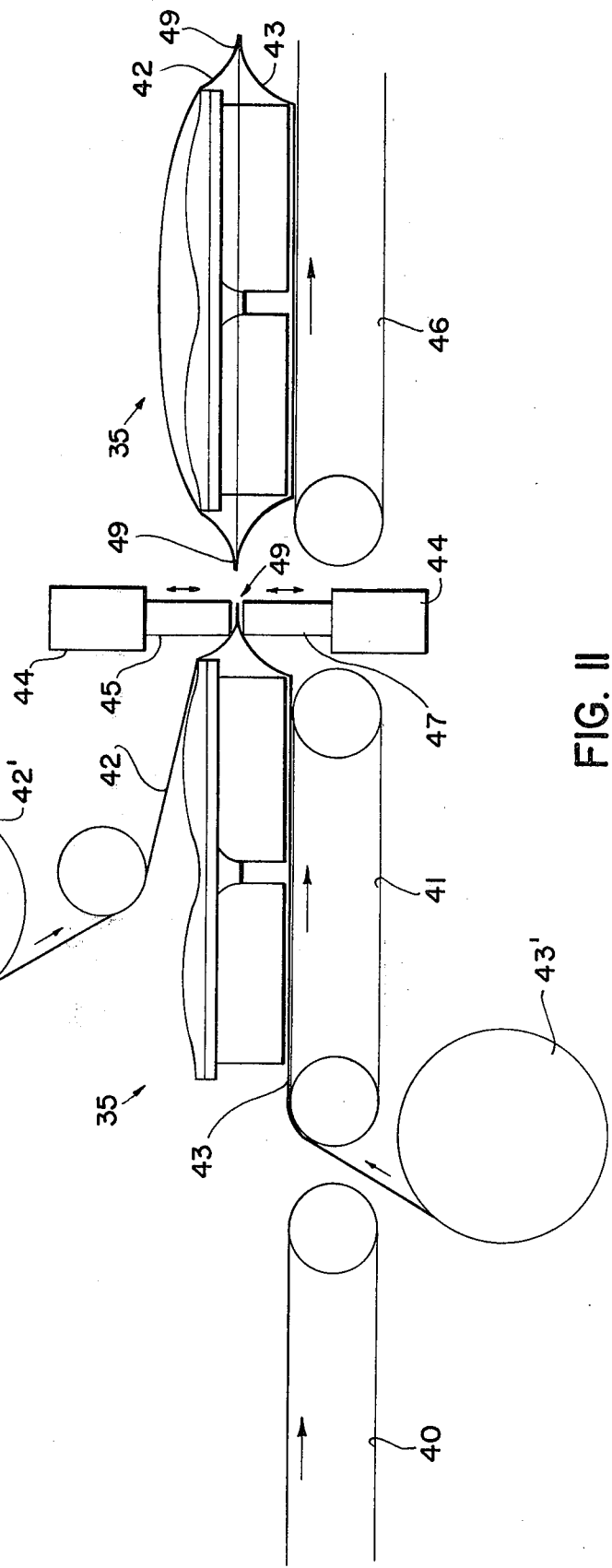
FIG. 11 is a side view of the wrapper heat sealing machine 44.

The sealed cups 35 progress along the conveyor 24 toward the conveyor 40 at which point they are placed on the conveyor 40 and aligned with the wrapping machine 44 which is shown in the side view of FIG. 11. The sealed cups 35 progress from the conveyor belt 40 onto the lower wrapping film 43 which may be, for example, a cellophane wrapping, which is played off the roll 43'. The sealed cups 35 are advanced along the conveyor belt 41 toward the wrapper heat sealing machine 44 and are covered by the upper wrapping film 42 which may also be cellophane, for example, which plays off the roll 42'. The lower wrapping film 43 and the upper wrapping film 42 are joined between the heat sealing anvils 45 and 47 of the heat sealing machine 44 and are heat sealed along their junction 49 all about the perimeter of the sealed cup 35, so as to form the heat sealed wrapper 48 shown in plan view in FIG. 12. The heat sealing anvils 45 and 47 are withdrawn from the path of the sealed cup 35 to enable the sealed cup 35 to progress to the conveyor belt 46 at which state the sealed cup 35 may be stacked in trays ready for shipment.

The resulting sealed cup 35, heat sealed in its wrapper 48, required only approximately 32 seconds to progress from station 18 where the cakes 25 are removed from their baking pan, until the wrapper heat sealing machine 44 completed enveloping the wrapper 48 about the sealed cup 35. The structural rigidity of the bakery goods tray structure 2 enabled the handling of the fragile, freshly baked cakes 25. The quick hardening, moisture impervious icing composition 34 sealed the cakes 25 within their trays 2 so as to provide a fresher, moisture cake for the consumer without having a sticky icing adhering to the inner surface of the heat sealed wrapper 48. The continuous strip icing 32 issuing from the strip icing machine 26 is easily decorated with a uniform, characteristic cake decoration which could serve as a trademark for the product, for example. The ability to pass the cake from removal from the tray to a sealed airtight package in 32 seconds allows the production of a very fresh cake because freshness is lost in the normal drying process of 15 or more minutes. The bakery goods tray structure 2 or 3, which may be composed of a metal foil such as aluminum or a plastic foil such as cellophane, polystyrene or polyethylene, eliminates the need for a bottom board which would tend to draw moisture from the cake.

It is understood that creme filled cakes make a cake with a higher amount of total moisture wherein this process provides even greater advantage.

Although specific embodiments of the invention have been disclosed, it will be understood by those with skill in the art that changes can be made of a minor nature therein without departing from the spirit and the scope of the invention.

What is claimed is:

1. In a quick-hardening icing composition capable of application to still warm, baked, bakery goods and subsequent immediate wrapping without substantial adherence of the icing to the wrapping due to the icing's ability to quick harden and capable of also providing a barrier to penetration of any residual moisture from the bakery goods to the icing, said composition including sugar, a stabilizer, an emulsifier, whey, vegetable starch powder, water, and fats, the improvement comprising:
   said composition including between 8.6 and 16.9 wt % whey, between 9.8 and 14.5 wt % vegetable starch powder, between 3.3 and 5.9 wt % high melting point fat and between 37.8 and 44.9 wt % sugar,
   said wt % being based upon the entire quick hardening icing composition.

2. An icing composition according to claim 1 wherein said icing composition includes between 10.9 and 13.0 wt % water.

3. An icing composition according to claim 2 wherein said fats include between 6.9 and 8.2 wt % shortening.

4. An icing composition according to claim 3 wherein said icing composition includes between 4.8 and 5.8 wt % stabilizer.

5. An icing composition according to claim 4 wherein said fats include between 1.9 and 2.3 wt % corn oil.

* * * * *